Figure 1:
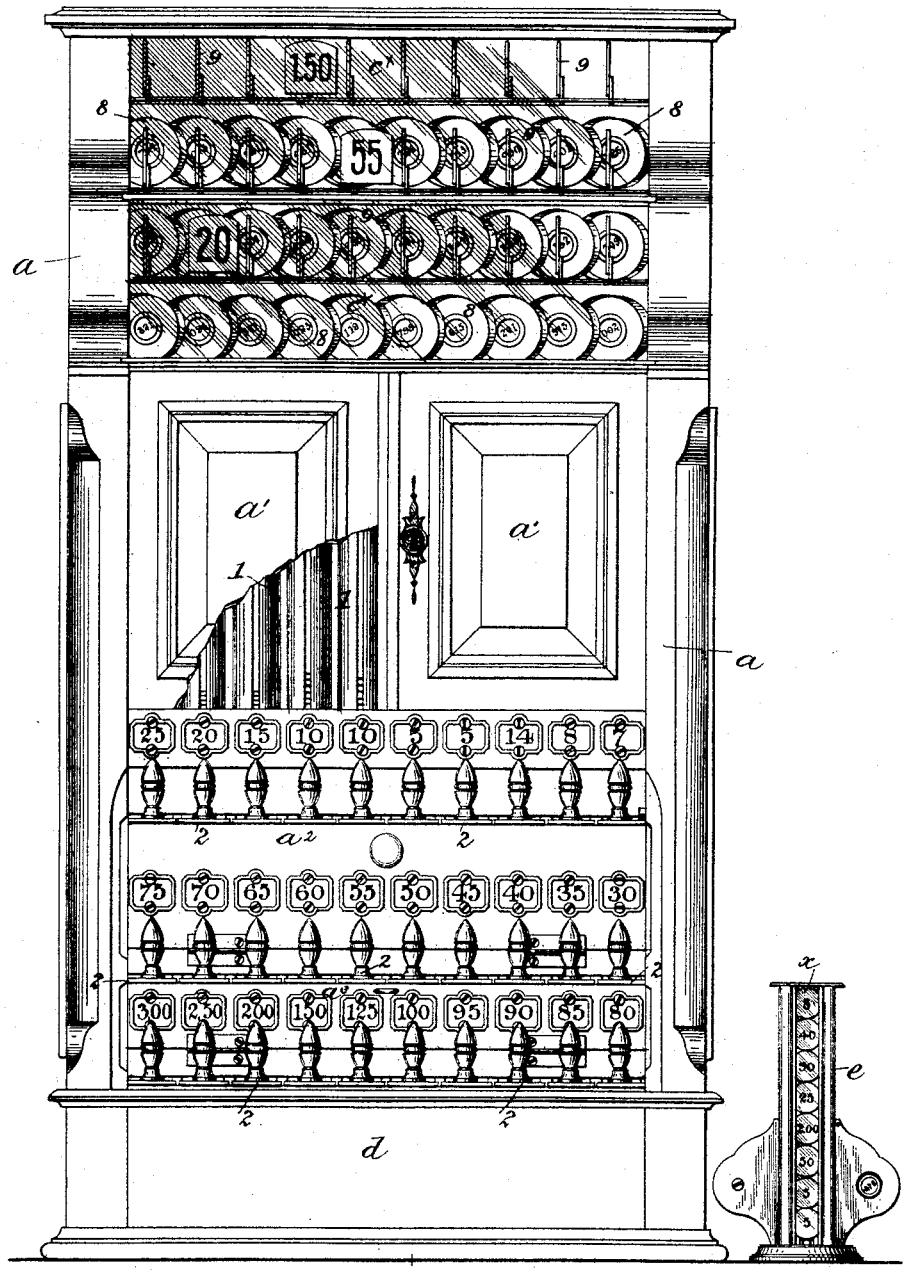

(No Model.) 8 Sheets—Sheet 1.

G. BOEMERMANN.
COMBINED CASH INDICATOR AND COIN COUNTER.

No. 411,573. Patented Sept. 24, 1889.

WITNESSES:

INVENTOR:

(No Model.) 8 Sheets—Sheet 2.
G. BOEMERMANN.
COMBINED CASH INDICATOR AND COIN COUNTER.
No. 411,573. Patented Sept. 24, 1889.

Fig: 2.

WITNESSES: INVENTOR:
George Boemermann
By Henry Connett
Attorney.

(No Model.) 8 Sheets—Sheet 3.
G. BOEMERMANN.
COMBINED CASH INDICATOR AND COIN COUNTER.
No. 411,573. Patented Sept. 24, 1889.

WITNESSES:

INVENTOR:
George Boemermann,
By Henry Connett
Attorney.

(No Model.) 8 Sheets—Sheet 4.
G. BOEMERMANN.
COMBINED CASH INDICATOR AND COIN COUNTER.
No. 411,573. Patented Sept. 24, 1889.
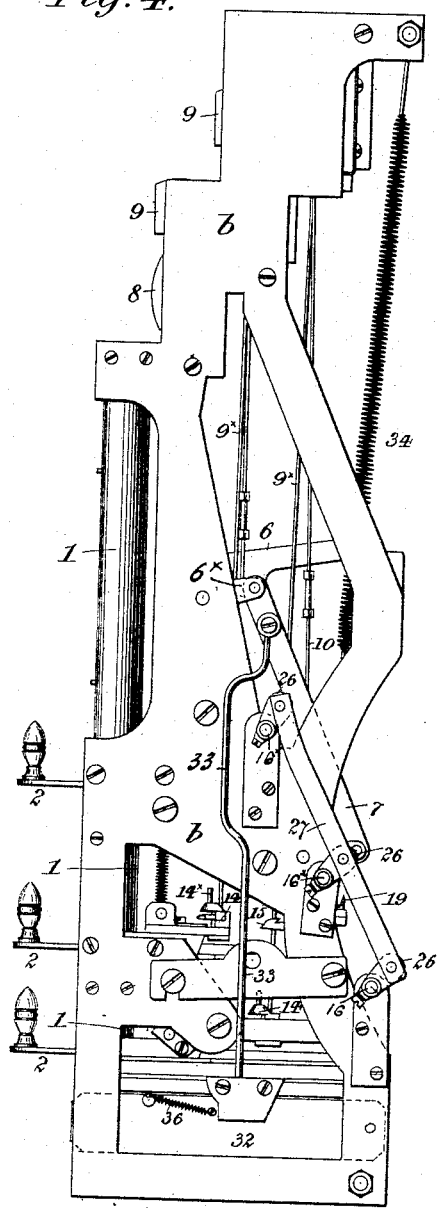
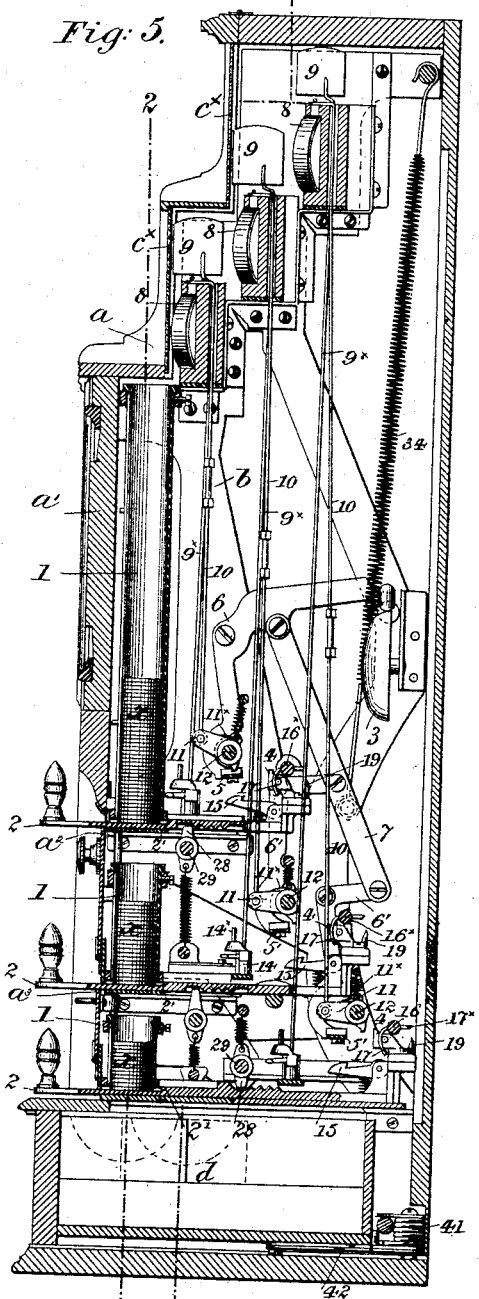
WITNESSES:
INVENTOR:
George Boemermann
By Henry Connett
Attorney.

(No Model.) 8 Sheets—Sheet 5.
G. BOEMERMANN.
COMBINED CASH INDICATOR AND COIN COUNTER.
No. 411,573. Patented Sept. 24, 1889.
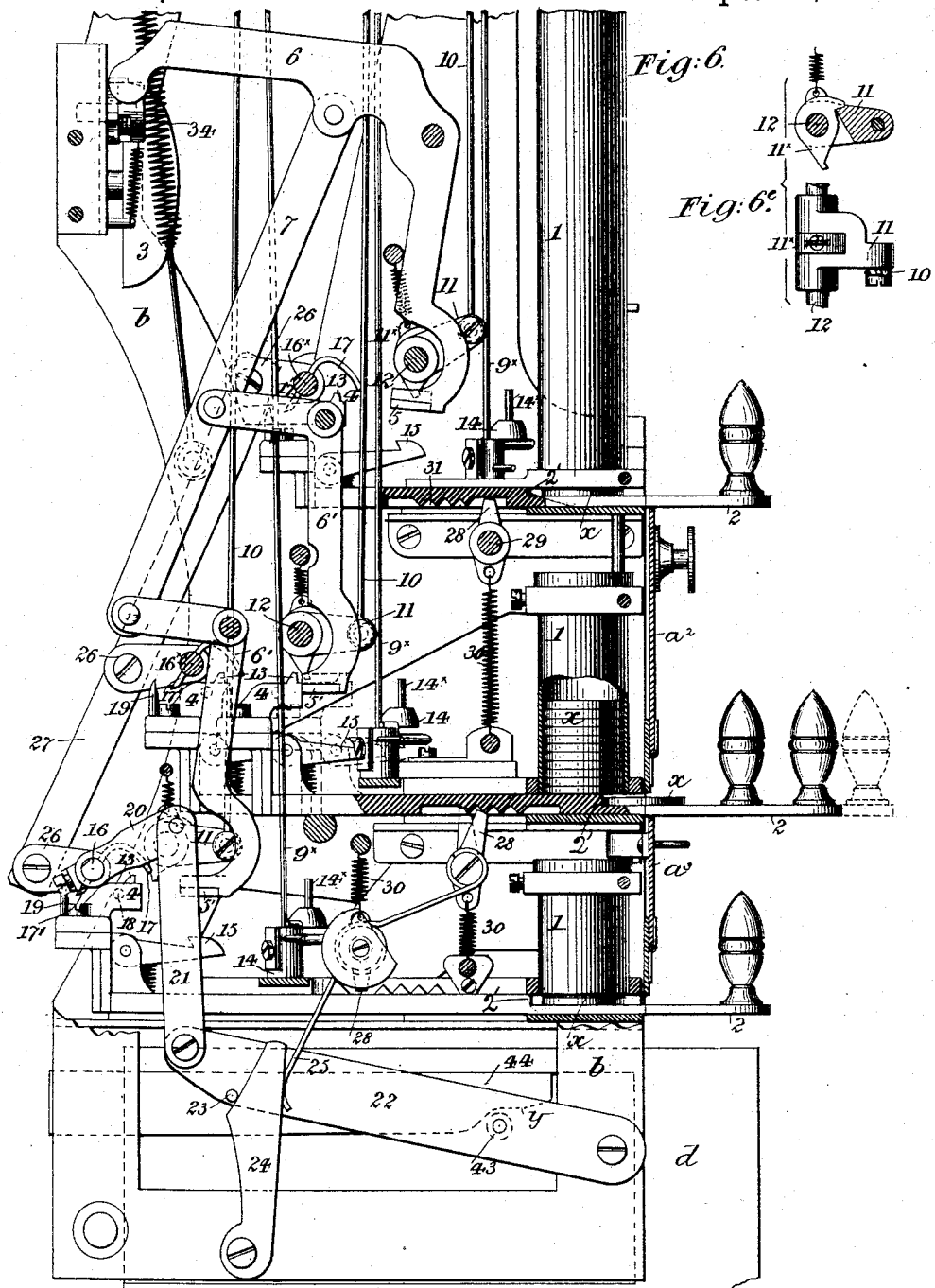
WITNESSES:
INVENTOR:
George Boemermann,
By Henry Connett
Attorney.

(No Model.)  
8 Sheets—Sheet 6.
G. BOEMERMANN.
COMBINED CASH INDICATOR AND COIN COUNTER.
No. 411,573.  
Patented Sept. 24, 1889.
Fig: 6ª
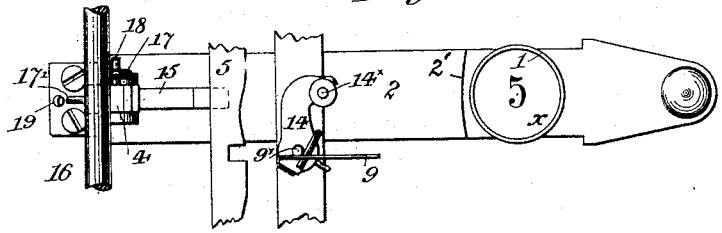
Fig: 6ᵇ
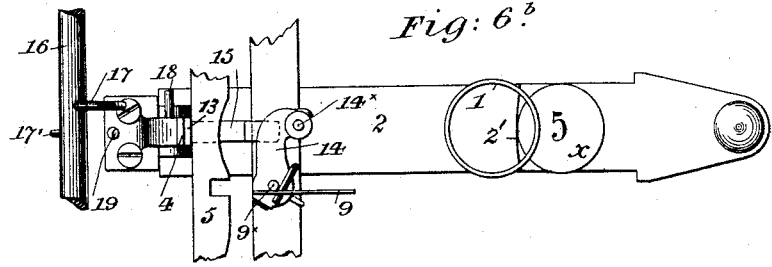
Fig: 6ᶜ
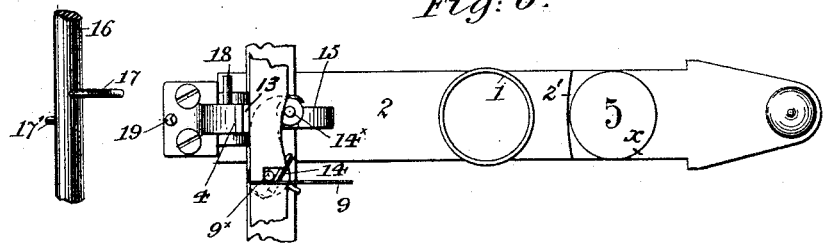
Fig: 6ᵈ
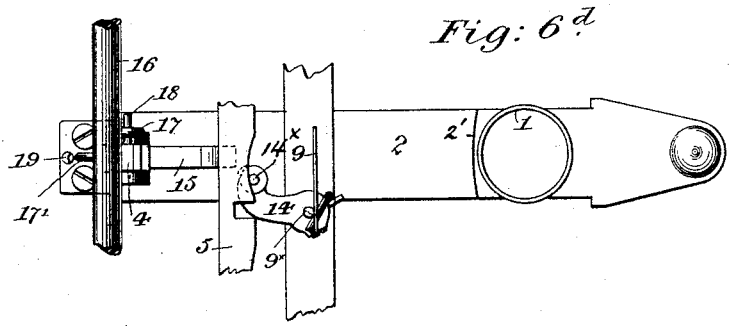
INVENTOR:  
George Boemermann,  
By Henry Connett  
Attorney.
WITNESSES:  
John A. Rennie  
J. B. Caplinger
N. PETERS, Photo-Lithographer, Washington, D. C.

(No Model.)  8 Sheets—Sheet 7.
G. BOEMERMANN.
COMBINED CASH INDICATOR AND COIN COUNTER.
No. 411,573.  Patented Sept. 24, 1889.
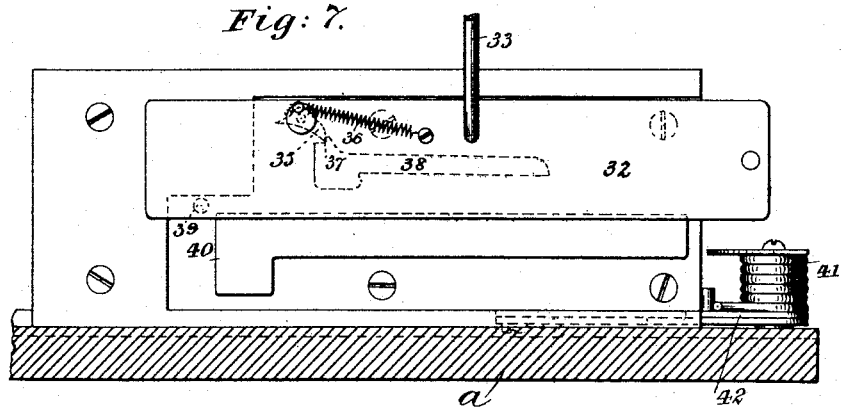
Fig: 7.
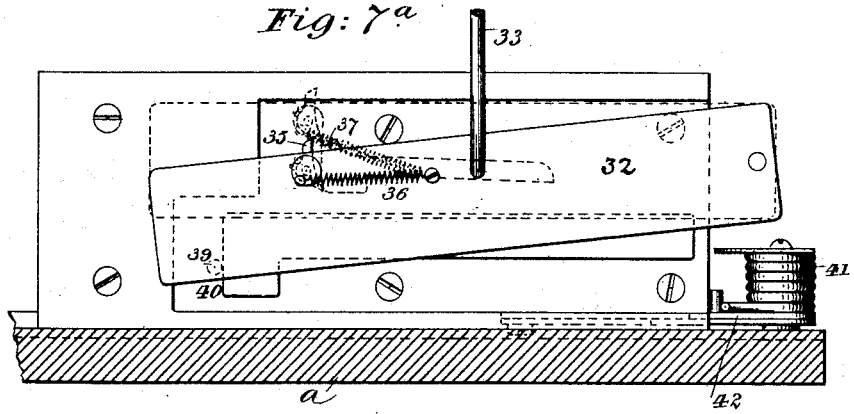
Fig: 7ª.
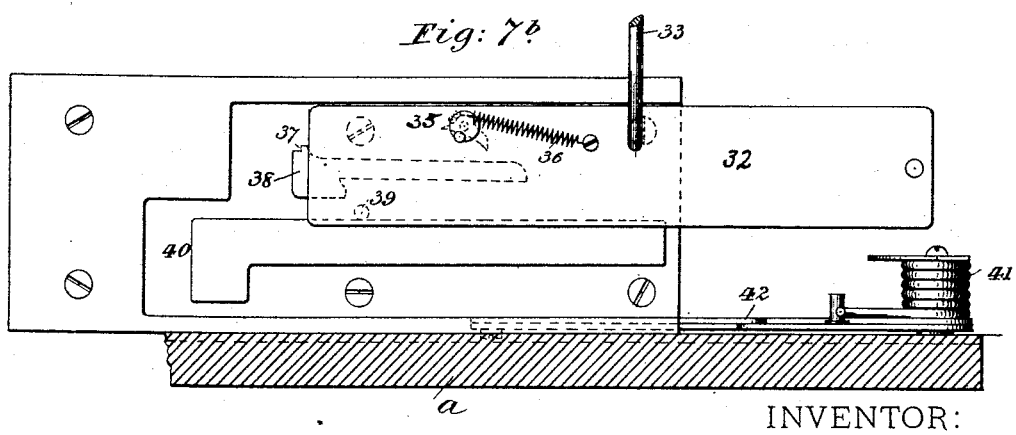
Fig: 7ᵇ.
INVENTOR:
George Boemermann.
WITNESSES:
John A. Rennie
J. S. Barringer
By Henry Connett
Attorney.
N. PETERS, Photo-Lithographer, Washington, D. C.

(No Model.) 8 Sheets—Sheet 8.
G. BOEMERMANN.
COMBINED CASH INDICATOR AND COIN COUNTER.
No. 411,573. Patented Sept. 24, 1889.
Fig: 8.
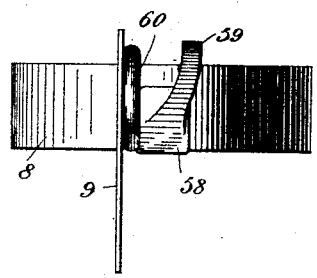
Fig: 8ª.
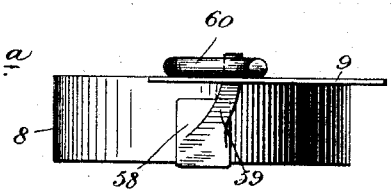
Fig: 8ᵇ.
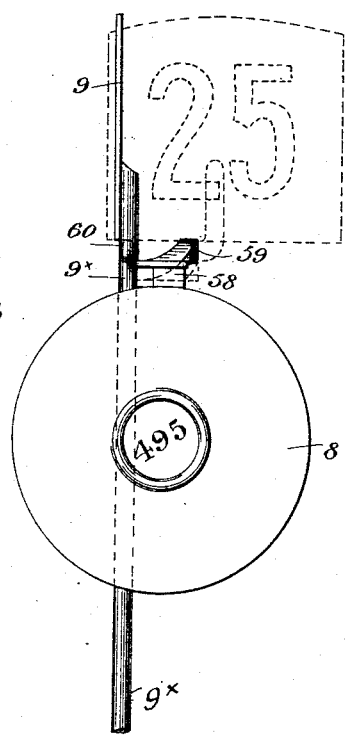
WITNESSES:
INVENTOR:
By
Attorney.

UNITED STATES PATENT OFFICE.

GEORGE BOEMERMANN, OF BROOKLYN, NEW YORK.

COMBINED CASH-INDICATOR AND COIN-COUNTER.

SPECIFICATION forming part of Letters Patent No. 411,573, dated September 24, 1889.

Application filed December 17, 1888. Serial No. 293,846. (No model.)

*To all whom it may concern:*

Be it known that I, GEORGE BOEMERMANN, a citizen of the United States, residing in Brooklyn, Kings county, New York, have invented certain Improvements in Apparatuses for Checking the Receipt of Moneys, of which the following is a specification.

My invention relates to that general class of apparatuses or devices employed in stores and saloons where money in small sums is being constantly received by the salesmen, the object being to put a check on peculation and to enable the proprietor to readily ascertain at the end of the day how much money has been taken in.

Before proceeding to describe the mechanical construction of my apparatus I will explain its purpose, its functions, and the manner in which it is employed, premising, however, that the manner of using it may be varied somewhat to suit the convenience of the proprietor and the character of his business. There may be but one lock which permits of access to the interior of the apparatus, and the proprietor has the key to this lock. Before business begins for the day the proprietor places in upright tubular check-holders, one of which is provided for each denomination of the checks, a number of checks, (preferably metal disks with the denomination stamped thereon,) keeping a record of the number and kind he puts in. He also places in the cash-drawer of the apparatus a sufficient amount of change to meet the ascertained requirements of the day, keeping of course a record of this also. He then makes a memorandum of the numbers as they stand on the check counter or register, one of which will be provided for each denomination of check used in the apparatus or for each "element" of the apparatus. He then closes the cash-drawer, and also closes and locks the door of the apparatus, whereon the apparatus is ready for use.

I will briefly explain that the apparatus is composed in the main of a number of like devices or elements dependently connected, each element corresponding to one denomination of currency—as, for example, five cents, ten cents, fifteen cents, &c., up to any amount. In the present apparatus I show three tiers of these elements with ten elements in each tier; but this number and arrangement is certainly not essential. Each element comprises a vertically-arranged or upright tubular check-holder open at the top to receive the checks, a check-pull which closes the bottom of the check-holder, and which, when drawn out, brings out with it the lower check of the pile, and a check counter or register, which, when the pull is pushed in, adds one. These elements are so connected that when either one of the check-pulls is drawn out the others are all locked. The pushing in of each pull exposes a figure or numeral, as "5" or "14," corresponding to the denomination of the element to which that pull belongs. A gong or bell is sounded by the drawing out of each pull, and the cash-drawer is unlocked and pushed out by the manipulation of the pull.

Suppose the salesman receives fifteen cents from a customer. He turns to the apparatus and draws out the check-pull numbered "15." He takes the check and pushes the pull "home." The numeral "15" appears at its proper place behind the glass in the front of the apparatus, one is added to the number visible on the check-counter belonging to element 15, and the cash-drawer is unlocked and pushed out. The salesman deposits the money in the drawer, making change, if required, and then pushes the drawer home, when it will be automatically locked. The visible numeral "15" will remain exposed until the next check-pull is drawn out, when it will be turned out of sight and the new numeral exhibited.

I will now describe my apparatus with reference to the accompanying drawings, wherein—

Figure 2:
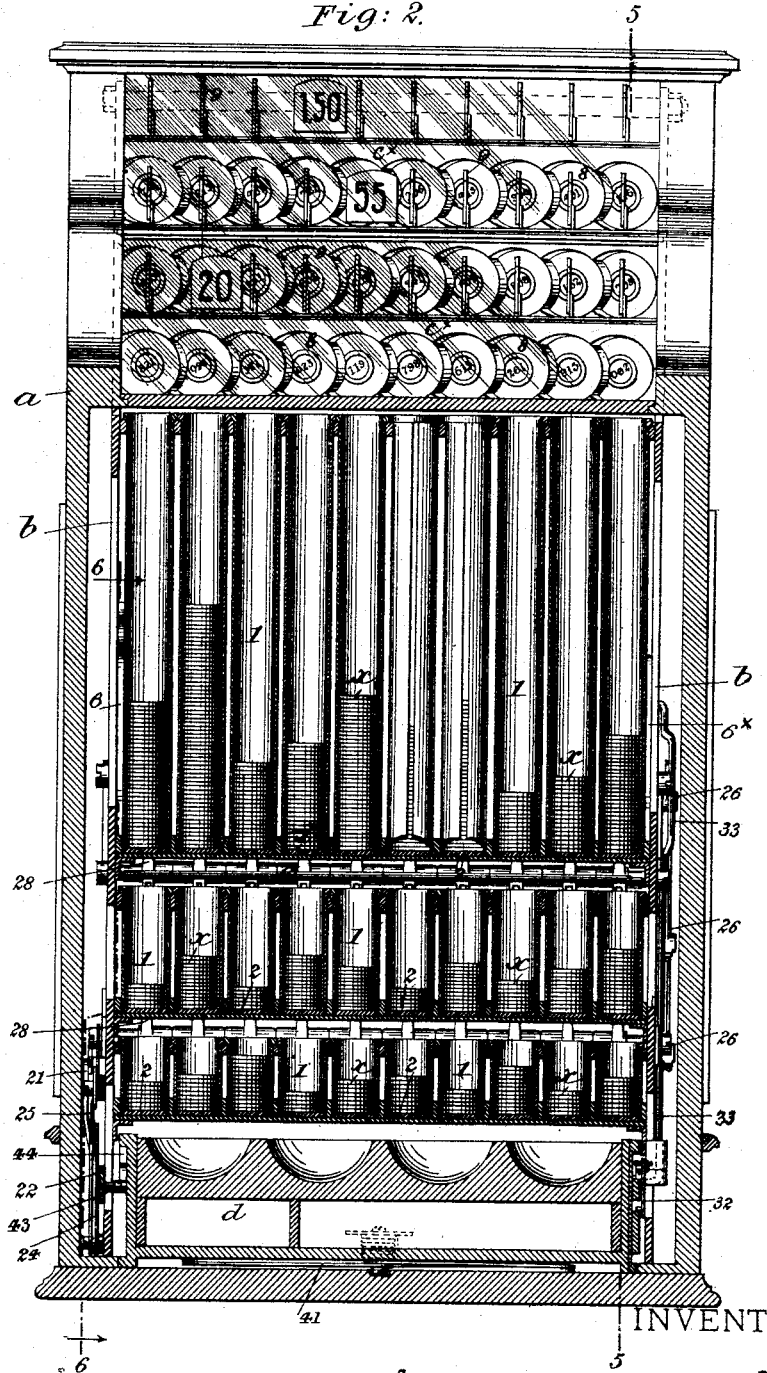
Figure 3:
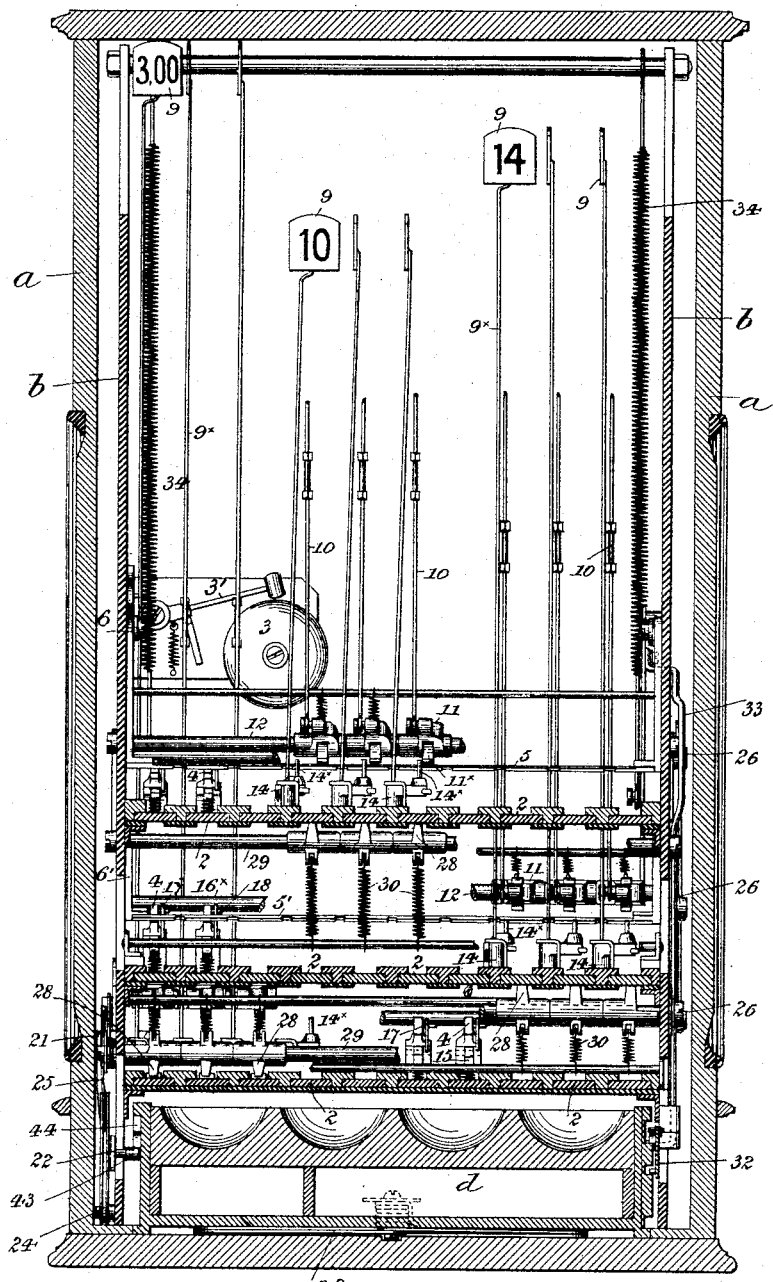

Figure 1 is a front elevation of an apparatus embodying my improvements, one of the doors being represented as partly broken away. Fig. 2 is a sectional front elevation, the plane of the section being substantially indicated by line 2 2 in Fig. 5. Fig. 3 is a view similar to Fig. 2, the plane of the section being, however, taken along line 3 3 in Fig. 5 or back of the tubular check-holders. Fig. 4 is a side elevation of the right-hand side of the apparatus represented as removed from the casing. Fig. 5 is a sectional side elevation, taken substantially in the plane indicated by line 5 5 in Fig. 1. Fig. 6 is a fragmentary sectional elevation of the lower part of the side of the apparatus opposite to that seen in Fig. 4, and on a scale double that of the principal figures. Figs. $6^a$, $6^b$, $6^c$, and $6^d$ are plan views of a check-pull and accessories on the same scale as Fig. 6. These views show the pull in its several positions. Fig. $6^e$ is a detached detail view of the rocker which actuates the counter. Figs. 7, $7^a$, and $7^b$ are end views of the cash-drawer on the same scale as Fig. 6, illustrating its operating and locking devices. Figs. 8, $8^a$, and $8^b$ illustrate a modification of the counter-actuating devices.

I will describe the apparatus as illustrated in the drawings, premising that the construction therein shown may be varied somewhat without materially departing from my invention.

$a$ represents a suitable casing for the operative mechanism, which casing may be of wood. Access to the casing may be had through main double doors $a'$. Within the wooden exterior casing $a$ is a metal frame $b$, in which the mechanism is mounted.

As the mechanism of the apparatus is mainly composed of thirty substantially like elements, I will not describe each of the elements minutely, but will describe the whole generally and point out how they are all dependently controlled or connected. For convenience of description I will designate the different elements by the denomination of the checks in the check-holder of the same as "element 20," "element 55," &c.

1 1 are tubular check-holders set upright in the frame $b$. These holders are filled with checks $x$ at their open upper end. Access is obtained to the upper tier of check-holders through the main door $a'$, to the next tier of holders through a door $a^2$; and to the lower tier of holders through a door $a^3$. The bottoms of the respective check-holders are formed by the check-pulls 2 2, the construction of which is clearly illustrated in Figs. 6 to $6^d$. The open bottom of the holder stands over and a little above the pull, and the lower check in the pile in the tubular holder rests on said pull and is below the end of said holder. This is the position represented in Fig. $6^a$. There is a shoulder $2'$ on the upper face of the pull, that takes behind the check when the pull is pushed home, whereby when the pull is drawn out, as seen in Figs. $6^b$ and $6^c$, the bottom check is drawn out with it. When the pull is pushed home, (after the removal of the check drawn out,) the pile of checks settles down onto the pull in front of the shoulder $2'$, and the operation may be repeated until all the checks are removed (one at a time) from the bottom of the pile. When the pull is out, its upper surface is flush with the bottom of the holder. When the pull is drawn out, it sounds a gong 3 (see Figs. 3 and 5) through the medium of mechanism I will now describe.

On each check-pull 2 is a shoulder 4. These shoulders on the upper tier of pulls take behind a swinging bar 5, which extends laterally across the apparatus over the pulls, and is secured at its ends, respectively, to the pendent arms of two elbow-levers 6 $6^x$, pivotally mounted on the frame $b$. The other arm of one of these levers 6 actuates the trip of the hammer $3'$ of the gong 3 in a well-known way. This mode of actuating the hammer of a bell or gong is too well known to require a minute description. When the pull 2 is drawn out, the shoulder 4 takes behind and moves forward the bar 5, and through the device described sounds the gong. If the check-pulls were all in one tier, the device described would suffice for all; but as there are two other and lower tiers of pulls, each of these tiers is provided with a swinging bar $5'$, (precisely like the bar 5,) which is secured at its ends to the pendent arms of elbow-levers $6'$, the other arms of which are coupled by links 7 to the corresponding arms of the main or upper elbow-lever 6. Thus the gong will be sounded when any one of the pulls of either tier is drawn out. When the check-pull is pushed in again, the number belonging to that pull and element is displayed, and one is added to the number displayed on the check-counter forming a part of the same element as the pull operated. I will now describe the devices for effecting these results.

In the upper part of the casing $a$ are arranged three tiers of check-counters 8 8 corresponding to the pulls below. The counters or registers herein shown will be constructed substantially like the counters or registers used on street-cars and on steam-engines to count the revolutions of same and register them. Therefore they will need no particular description, and any style of counter or register may be employed in lieu of this. The operating knobs or plungers of the counters are actuated by rods 10 10, each of which is coupled at its lower end to a rock-arm 11, which turns freely on a fixed cross-rod 12 in the frame $b$. There are three of these rods 12, one arranged above each tier of pulls, and there is one rock-arm 11 over each pull 2. Whenever the rock-arm 11 is depressed it acts through the rod 10 on the operating-plunger of the counter, and this depression of the arm is effected by a spring-rocker $11^x$, arranged between the pivoting branches of the arm 11 and rocking also on the rod 12, as seen in the detached sectional view and plan, Fig. $6^e$. When the pull is drawn out, a shoulder or projection 13 thereon engages and wipes over the beveled pendent branch of the rocker $11^x$, putting the coil-spring thereof under momentary tension, and when the pull is pushed in the shoulder 13 thereon engages said pendent branch of the rocker $11^x$ from the other or front side and rocks it. The upper branch of the rocker takes over the rocker-arm 11, and the latter is by this means compelled to partake of the movement of the rocker $11^x$, thus drawing down rod 10 and actuating the mechanism of the counter 8. Before the pull is pushed entirely home the shoulder 13 thereon will pass and clear the rocker $11^x$ and allow the parts to assume their normal position.

The counters 8 are arranged behind glass plates $c^x$ $c^x$ in the upper part of casing $a$, and adjacent to them are placed the numeral-bearing plates 9 9, one for each pull 2. When any pull is drawn out, it turns edgewise the plate 9 that had previously peen exposed, so that the numeral thereon will not be visible, and when said pull is pushed in it turns the plate 9 with which it is connected or which belongs to it around a quarter-turn, so as to face the front and exhibit the numeral thereon. In Figs. 1, 2, and 3 I have shown one numeral-plate in each tier turned so as to exhibit the numeral thereon; but this is only for purposes of illustration. Only one plate can be so turned at one time, for reasons that will be hereinafter explained. Each plate 9 is or may be a bit of sheet metal having the proper numeral, as "5," "20," "55," &c., painted on its face, and this plate is secured to a vertically-arranged or upright shaft $9^x$, rotatively mounted in bearings in the frame $b$. A stiff wire will serve for the shaft. When the shaft is turned a quarter-way round in one direction, the plate 9 presents its edge to the observer, and when turned a quarter-way round in the other direction presents its face to the observer. In Figs. 1 and 2, for example, the plates bearing the numerals "20," "55," and "150" are turned to face the observer.

The mechanism whereby the shafts $9^x$ are turned I will now describe, with special reference to Figs. 6 and $6^a$.

On the lower end of the vertical shaft $9^x$ is fixed a crank-arm 14, which, when the plate 9 stands edgewise to the observer, (the normal position,) stands across the path of the pull 2 and over the pull, as seen in Fig. $6^a$. When the pull is drawn out, a spring hook-pawl 15 carried thereby wipes under crank-arm 14, and the hook on the pawl engages the front edge of said arm near its free end. When the pull 2 is pushed home, the hook-pawl 15 swings the arm 14 around to the position seen in Fig. $6^d$, thus imparting a quarter-turn to the shaft $9^x$ and turning the plate until it faces the observer. The arm 14 will stand thus, as seen in Fig. $6^d$, until the next pull is draw out, when the swinging bar 5 (or 5', as the case may be) in its forward movement will strike an upright pin $14^x$ on arm 14 and swing said arm back to its normal position. Thus when any pull whatever is drawn out the swinging bar will return to its normal position the crank-arm 14, that will have been swung round by the pull last pushed in.

When one pull 2 is drawn out, all the other pulls are locked, and no other pull can be drawn out until this one is pushed home. I will now describe the means by which this locking and unlocking of the pulls is effected. In describing this device I will refer to the lower tier of elements in the first instance and to Figs. 4, 6, $6^a$, $6^b$, $6^c$, and $6^d$ for illustration.

16 is a rock-shaft, which extends laterally across the frame $b$ at the back part thereof. This shaft stands above or over all the pulls 2 of the lower tier, and is provided with two classes of pins 17 and 17', which project laterally from the shaft 16. Over each pull 2 of the lower tier is arranged one of the pins 17 and one of the pins 17'. Normally, when the pulls are all pushed in, the hook-like front pin 17 hooks over and stands in front of a laterally-projecting stud 18 on the pull 2. When the pull is drawn out, this stud 18 engages the front pin 17, and by its action thereon imparts a partial backward rotation to the rock-shaft 16. The effect of this is to turn the short straight rear pin 17' (on shaft 16) until it projects downwardly. When in this position, the several pins 17' stand directly in front of and in the path of upright studs 19 on the inner ends of the respective pulls 2. Thus these pins 17' act as stops to prevent any other pull from being drawn out while one pull is drawn out. The pins 17' on the rock-shaft and the upright studs 19 on the pulls are so arranged relatively that when all the pulls have been pushed home the pins 17' will stand above and out of the path of the respective studs 19, and when a pull is drawn out the shaft 16 will not be rocked by the movement of the pull until the stud 19 on the pull shall have advanced far enough for the pin 17' to descend behind it. When the pull is again pushed in, the stud 19 strikes the pin 17' that it finds in its path and rocks the shaft 16 forward again, the stud 18 on the pull moving back just in time for the hooked front pin 17, which will be descending, to take over in front of it. Thus when all the pulls are pushed in home all will stand unlocked, and either may be drawn out at will.

In order to hold the rock-shaft 16 somewhat firmly and steadily in its two positions, and thus prevent it from being partially rotated by jarring or jolting, I provide it with a sort of spring-lock, which I will now describe with special reference to Fig. 6.

On the end of rock-shaft 16 is secured an arm 20, which is coupled by a link 21 to a side lever 22, pivotally mounted on the end of frame $b$. On the face of lever 22 is a stud 23, which, when the lever 22 is moved up and down by the rocking of shaft 16, plays over two oppositely-arranged inclines on the edge of a latch-lever or spring-latch 24, pivoted also in the frame $b$ and backed by a spring 25, which holds said latch up elastically to the stud 23. When the rock-shaft 16 is at the middle point of its rocking movement, the stud 23 will stand at the apex where the two inclines on the latch-lever meet, and the inclines on said lever thus serve to hold the rock-shaft with some firmness and stability in the two terminal positions in which it is placed by the pulls.

I will now explain that by reason of the arrangement of the pulls in three tiers three rock-shafts are required, all constructed and arranged to operate in precisely the same manner. For distinction I have indicated the two uppermost rock-shafts by the numerals $16^\times$. Each of these three rock-shafts 16 $16^\times$ $16^\times$ has on its end a crank-arm 26, (see Fig. 4,) and these three arms are coupled together by a link-bar or connecting-rod 27. Thus all of the shafts are compelled to rock in unison. When one of the pulls 2 in either tier is drawn half-way out, it cannot be pushed in again until it has been drawn fully out, and if pushed half-way in it must be pushed in home before it can be again drawn out. The means employed for effecting this is the same for all the pulls, and it consists of a series of beveled teeth on the face of the pull and a swinging spring-pawl pivoted in the frame $b$. In the two uppermost tiers of pulls the pawls are hung below the pulls and the teeth are on the lower faces of the pulls; but in the lower tier the pawl is above the pull. The only reason for this difference is that in the lower tier the pawls, if placed below the pulls, would interfere with the cash-drawer. The arrangement might be the same for all the pulls, and it will only be necessary to describe one pull with its pawl, with special reference to Fig. 6, wherein a pull of the middle or intermediate tier is shown as drawn about half-way out, while the pulls of the upper and lower tier are shown as pushed home.

Referring especially to the two upper tiers of pulls, 28 is a pawl with a square end pivoted or rocking on a rod 29, extending across the frame $b$ from side to side, and 30 is a coil-spring attached to the lower end of said pawl, below the rod 29. This spring holds the pawl erect normally, as seen in the upper tier in Fig. 6. When standing thus erect, the upper end of the pawl stands clear and free from the face of the pull under which it is placed. When the pull is drawn out part way, as represented in the middle tier of pulls in Fig. 6, teeth 31, which project from the lower face of the pull and in the path of which the pawl 28 stands, engage the upper end of the pawl and push or swing it over toward the front, the pawl riding over the teeth as over the teeth of a ratchet. While the pawl is thus in engagement with one of said teeth the pull cannot be pushed in again; but when said pull shall have been drawn out until all the teeth have passed it the spring 30 will right the pawl again. The pull may now be pushed in, when the teeth on the pull will again engage it and push or swing it over in the other direction. Its square end will now engage the opposite faces of the teeth, and thus prevent the pull from being drawn out until it has been pushed fully home.

The pawls 28, that lock the pulls of the lower tier, operate in the same way as those described; but the teeth 31 are on the upper faces of the pulls of this tier, and the pawls are above the pulls.

In the bottom of casing $a$ is a cash-drawer $d$. This drawer is provided with locking and unlocking mechanisms, which are actuated and controlled by the pulls. Reference may be had to Figs. 4, 5, 6, 7, $7^a$, and $7^b$ for a full understanding of the operation of this part of the apparatus. Fig. 7 shows the drawer pushed in home and locked, Fig. $7^a$ shows the position of the locking devices when a pull 2 has been drawn out, and Fig. $7^b$ shows the position of the parts when the pull has been pushed in and the drawer $d$ protruded by the spring. On the end of the frame $b$ (the right-hand end, as herein shown) is pivoted a flat lever 32, which is adapted to play up and down edgewise adjacent to that end of the cash-drawer $d$, and this lever is coupled by a rod 33 to the link 7, that couples together the elbow-levers $6^\times$ $6'$ $6'$, whereby the gong 3 is sounded. Thus when either one of the several pulls 2 is drawn out the lever 32 will descend, and when the pull is again pushed in the lever will rise to its normal or first position again. The coil-springs 34 34 serve to retract the parts, said springs being attached at their lower ends to the links which connect the several elbow-levers.

Pivoted on the inner face of the lever 32 is a pawl 35, provided with a spring 36. When the lever 32 is elevated, as seen in Fig. 7, and the cash-drawer $d$ is pushed in, the nose of the pawl 35 stands in front of a shoulder 37 on the end of the drawer and locks the latter, so that it cannot be withdrawn, and when the lever 32 is moved down, as seen in Fig. $7^a$, by the drawing out of a pull 2, the pawl 35 is tilted or turned back by its nose catching on the end of a rib 38 on the cash-drawer. This rib 38 has the shoulder 37 formed on it. When the lever 32 descends, the pawl 35 is turned on its pivot until the spring 36, which before tended to keep the pawl pressed down, pulls from the opposite side of the pivot or fulcrum and tends to raise or throw up the nose of the pawl to the position seen in Fig. $7^a$. As the lever 32 descends, a pin or stud 39 on the inner face thereof passes down in front of a shoulder 40 on the end of the cash-drawer $d$. Now, when the pull 2 is pushed in home and the lever 32 is again raised to its first position, the stud 39 holds the drawer until the pawl 35 is raised clear of the rib 38 and the tail of the pawl stands in front of the shoulder 37. When the said stud 39 clears the shoulder 40 by rising above it, a spring 41 at the bottom of casing $a$, back of the drawer $d$, throws or pushes the drawer out, as seen in Fig $7^b$. This spring 41 acts on the drawer through the medium of "lazy-tongs" 42, of a common construction, which will require no particular description. The position of the lever and pawl at the moment the drawer is unlocked is represented by dotted lines in Fig. 7ª. When the drawer is pushed out, the shoulder 37 thereon strikes the tail of the pawl 35 and reverses it, turning its nose over and back to the position seen in Fig. 7ᵇ. When the salesman has deposited the money in the drawer, he pushes the latter in again, and the nose of the pawl wipes over the shoulder 37 and takes position again in front of it as at first.

When the drawer is pushed out or protruded, none of the pulls 2 can be drawn out. Consequently the salesman must push in the drawer before he can use any of the pulls. This locking of the pulls by the drawer is effected by means illustrated in Fig. 6.

From the inner face of the side lever 22 a pin or stud 43 projects under the edge of a plate 44 on that end of the cash-drawer $d$, and when the drawer is pushed in and all the pulls 2 are pushed home this lever 22 will be in its lowest position and will stand about horizontal as the construction is herein represented. In Fig. 6 said lever is shown elevated, as one of the pulls is represented as partly drawn out. A part of the plate 44 is cut away at its front end, so as to make room for stud 43, as indicated in dotted lines at $y$ in Fig. 6, when the lever 22 is elevated. Now, when the pull 2 has been pushed home and the drawer $d$ thus unlocked by the devices previously described, the stud 43 will stand below and just clear of the lower straight edge of plate 44, so that said stud will not interfere with the movement of the drawer. At the same time, however, the lever 22 cannot rise while the drawer is out, because of the stud 43 standing under the plate or rib thereon. It will be obvious that no pull can be drawn out without raising said lever 22, and consequently the drawer, when out, locks all the pulls.

I have stated that one key locks up the casing, although there are three doors in reality, whereby access may be had to the check-holders of the several tiers. The main door or doors $a'$ are hinged at the sides and are provided with an ordinary lock and key. The doors $a^2$ and $a^3$ are hinged at their lower edges and are secured by a vertically-arranged bolt operated from the interior when the doors $a'$ are open. Thus the lower doors $a^2$ and $a^3$ cannot be opened except by first opening the main doors.

Any number of elements may be employed in the apparatus—that is, fifteen elements may serve for some kinds of business, while more will be needed for others, and the elements might all be arranged in a single tier in some cases, especially where the number is not great. When the elements are thus arranged in one tier, a greater degree of simplicity may be attained, as all the connecting devices and the duplication of parts caused by this arrangement in tiers may be avoided. I have shown two elements 5 and two elements 10, as more checks of these denominations are usually required than of any other denomination.

It will be obvious that my apparatus can be operated quite successfully without any checks $x$ at all, the counters or registers 8 being relied on to designate the number of operations of the pulls of the several elements; but there are important advantages in the use of checks, as is well known. Ordinarily the checks as they are removed by the pulls will be put into a suitable check-receiver, one of which is seen at $e$ on the right of the apparatus illustrated in Fig. 1. This receiver forms no part of my present application, and therefore need not be described. Some form of check-receiver will, however, be usually employed in connection with my apparatus.

My apparatus is susceptible of some variation without any material departure from the principles of the invention. For example, the counters or registers 8 may be actuated by or through the medium of the quarter-turn given to the shafts $9^x$. I have shown how this may be done in Figs. 8, 8ª, and 8ᵇ, of which the first two are plan views and the last a front elevation of the device. In these views 8 is the counter, and 58 is the operating-plunger thereof. By pushing in the plunger the interior mechanism is actuated, and when the pressure is removed the spring within the counter again protrudes the plunger. On the top of the plunger is secured an inclined track or way 59, over which plays or wipes the arm 60 on the shaft $9^x$, which carries the numeral-bearing plate 9. Thus when said shaft is turned to display the numeral on the plate said arm plays over the inclined upper surface of the track 59 and presses plunger 58 in. This is the position of the parts represented in Fig. 8ª and by dotted lines in Fig. 8ᵇ. When the shaft is turned back to the position represented in full lines in Figs. 8 and 8ᵇ, the plunger is again protruded by its spring. By this construction considerable complexity is avoided. The arm 60 may have an anti-friction roller or sleeve where it plays over the track 59.

I have shown rod 33 (see Fig. 4) as coupled at its upper end to one of the coupling-links 7; but this is only for convenience. If only one tier of pulls were employed, this link 7 would not be used. The rod 33 may be coupled directly to the hanger or elbow-lever $6^x$. As the elbow-lever $6^x$ is not employed to sound the gong, its upper arm need not be so long as that of lever 6; indeed, the supports for the bars 5 5' 5' at one end might be merely suspended hangers or arms, and the coupling 7 at that end be omitted.

Instead of drawer $d$ being provided with a spring to push it out, it may be set in inclined guides or bearers, so as to run out by gravity when unlocked.

The check $x$ may have any contour, and the holders 1 1 need not be cylindrical tubes, although this form of holder is preferred.

Having thus described my invention, I claim—

1. In an apparatus for checking the receipt of money, the combination, with a series of check-holders and a series of pulls 2 for removing the checks from same, of locking mechanism actuated by the operation of each pull, whereby when any pull is operated it locks all the other pulls of the series.

2. In an apparatus for checking the receipt of money, the combination, with a series of check-holders, a series of check-removing pulls 2, and a locking mechanism actuated by the operation of each pull, whereby when any pull is operated it locks all the other pulls of the series, of a gong or bell 3, its striking mechanism, and intermediate mechanism, substantially as described, whereby the operation of any pull in the series sounds the gong.

3. In an apparatus for checking the receipt of money, the combination, with a series of pulls 2 and a locking mechanism actuated by the operation of the several pulls, whereby the operation of each pull locks all the others, of a series of counters or registers, one for each pull, and an intermediate counter-actuating mechanism, whereby the operation of the pull actuates the counter.

4. In an apparatus for checking the receipt of money, the combination, with a series of check-holders and a series of pulls 2, one for each check-holder, of a series of numeral-bearing plates 9, one for each pull, and intermediate shifting mechanism, substantially as described, whereby the operation of a pull turns the side of the plate bearing the numeral into view and the operation of the next succeeding pull turns said numeral out of sight.

5. In an apparatus for checking the receipt of money, the combination, with a series of check-holders and a series of pulls 2, one to each check-holder, for removing the checks singly from their respective holders, of a cash-drawer and a locking device for said drawer, which is unlocked by the movement of any one of said pulls.

6. In an apparatus for checking the receipt of money, the combination, with a series of check-holders, of a series of pulls 2, one to each holder, for removing the checks singly from their respective holders, each of said pulls being provided with an automatic stop, which prevents the pull from being pushed back when only partly drawn out.

7. In an apparatus for checking the receipt of money, the combination, with a series of pulls 2, each provided with studs 18 and 19, of a rock-shaft 16, extending laterally over said pulls, said rock-shaft being provided with front pins 17 17, to engage studs 18 on the respective pulls, and with stop-pins 17' 17', to engage studs 19 on the respective pulls, substantially as and for the purposes set forth.

8. In an apparatus for checking the receipt of money, the combination, with a series of pulls 2, each provided with studs 18 and 19, of a rock-shaft 16, extending laterally over said pulls and provided with pins 17 and 17', arranged as described, the side lever 22, provided with a stud 23 and coupled to an arm on rock-shaft 16, and the spring-latch 24, provided with inclines on its face, over which stud 23 plays, substantially as set forth.

9. In an apparatus for checking the receipt of money, the combination, with two tiers of pulls arranged one above the other, each pull being provided with studs 18 and 19, as described, of the rock-shafts 16 and $16^\times$, which extend over the upper and lower tiers of pulls, respectively, and are each provided with pins 17 and 17', arranged as shown, the arms 23 on said rock-shafts, and the link 27, coupling said arms, whereby the rocking motion of one shaft is communicated to the other, for the purpose specified.

10. In an apparatus for checking the receipt of money, the combination, with a series of check-holders and a series of check-removing pulls 2, each provided with a shoulder 4, of the elbow-levers 6 $6^\times$, pivotally mounted on the frame, the swinging bar 5, secured at its ends to the pendent arms of said levers and extending over the pulls in the paths of the shoulders 4 thereon, the gong 3, and its hammer actuated by the arm of one of said elbow-levers, whereby the operation of either pull in the series sounds the gong.

11. In an apparatus for checking the receipt of money, the combination, with two tiers of pulls 2, arranged one above the other, each pull being provided with a shoulder 4, of the main elbow-levers 6 $6^\times$, the swinging bar 5, uniting same and extending over the upper tier of pulls, the elbow-levers 6' 6', the swinging bar 5', uniting same and extending over the other tier of pulls, the link 7, coupling together the said elbow-levers 6 and 6', the gong 3, and its hammer actuated by the arm of one of said elbow-levers, substantially as set forth.

12. In an apparatus for checking the receipt of money, the combination, with a series of pulls 2, each provided with a shoulder 13, of a series of counters or registers 8, their actuating-rods 10, a rod 12, extending across and over the pulls, the rocking arms 11 on said rod 12, one over each pull and coupled to one of said rods 10, and the spring-rockers $11^\times$, also mounted on said rod 12 and actuated by the respective pulls, substantially as set forth.

13. In an apparatus for checking the receipt of money, the combination, with a series of pulls 2, each provided with a spring-hook pawl 15, of the numeral-bearing plates 9, their respective shafts $9^\times$, one for each pull, and the arms 14, one on each shaft $9^\times$, said arms extending out over the pull in the path of the hook-pawl thereon, substantially as set forth.

14. In an apparatus for checking the receipt of money, the combination, with a series of pulls 2, each provided with a hook-pawl 15 and a shoulder 4, of the numeral-bearing plates 9, their respective shafts 9×, one for each pull, the arms 14 on the respective shafts 9×, each arm standing over its pull and provided with a pin 14×, and the swinging bar 5 and its supports, said bar extending over the series of pulls and adapted to engage the pins 14× on arms 14, substantially as set forth.

15. In an apparatus for checking the receipt of money, the combination of a series of pulls 2, each provided with a shoulder, the swinging bar extending across over said pulls in the paths of said shoulders, elbow-levers in the arms of which said swinging bar is secured, a lever 32, pivoted to the main frame and coupled to one of said elbow-levers, whereby vibration of said swinging bar imparts vibration to said lever 32, the pawl 35 on said lever 32 and its spring, the pin 39 in said lever 32, and the cash-drawer provided with a rib 38, a shoulder 37, and a shoulder 40, all arranged to operate substantially as set forth.

16. In an apparatus for checking the receipt of money, the combination, with a series of pulls 2, each provided with studs 18 and 19, of the rock-shaft 16, provided with the pins 17 and 17′, arranged as described with reference to the studs on the pulls, the arm 20 on the said rock-shaft, the side lever 22, provided with a stud 43, the link 21, connecting lever 22 with arm 20, and the cash-drawer $d$, provided at its end adjacent to lever 22 with a plate 44, under which stud 43 stands, said plate having a recess $y$ in its lower edge, all substantially as and for the purpose set forth.

17. In an apparatus for checking the receipt of money, the combination, with the check-holders and the check-removing pull 2, provided with a series of projecting teeth 31, of a rocking spring-pawl 28, held normally with its axis at right angles to the plane in which the pull plays, said pawl being adapted to engage said teeth, as set forth.

18. In an apparatus for checking the receipt of money, the combination, with a series of pulls 2, of a cash-drawer, locking devices for said drawer, and intermediate mechanism between said locking devices and pulls, whereby the drawing out of a pull sets said devices and the pushing in of said pull unlocks the drawer, as set forth.

19. In an apparatus for checking the receipt of money, the combination, with a series of pulls 2, of the intermediate mechanism whereby the drawing out of one pull locks all the others, the gong, the intermediate mechanism whereby the pulls sound the gong, the counters or registers, and the intermediate mechanism whereby the pulls actuate said registers, substantially as set forth.

20. In an apparatus for checking the receipt of money, the combination, with a series of check-holders and a series of check-removing pulls 2, of the cash-drawer and the locking mechanism for said drawer, said locking mechanism being actuated by said pulls.

21. In an apparatus for checking the receipt of money, the combination, with a series of check-holders and a series of check-removing pulls 2, of the counters or registers, the intermediate mechanism whereby said pulls actuate said registers, the number-bearing plates, and the intermediate mechanism whereby the pulls actuate said plates, as set forth.

In witness whereof I have hereunto signed my name in the presence of two subscribing witnesses.

GEORGE BOEMERMANN.

Witnesses:
HENRY CONNETT,
JOHN D. CAPLINGER.